McCLELLAN C. FULLENLOVE.
SHOCK ABSORBER.
APPLICATION FILED MAY 22, 1912.
1,068,644.
Patented July 29, 1913.
2 SHEETS—SHEET 1.
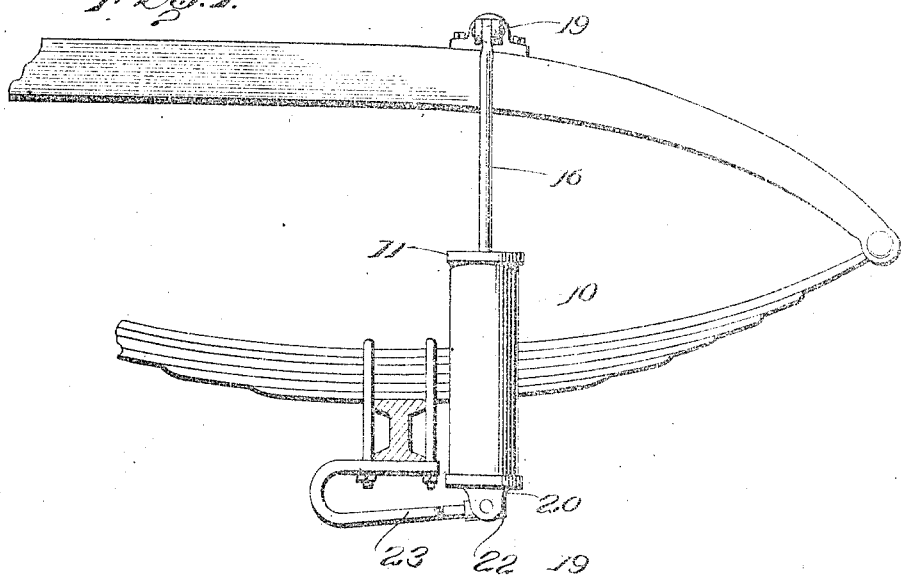
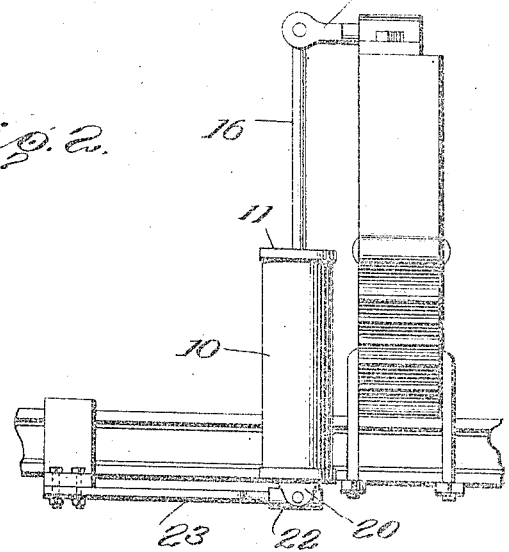
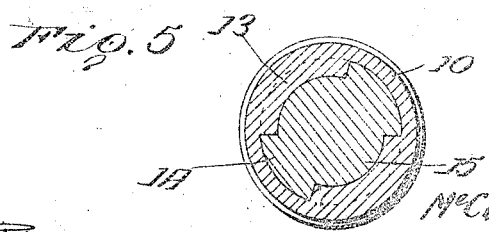

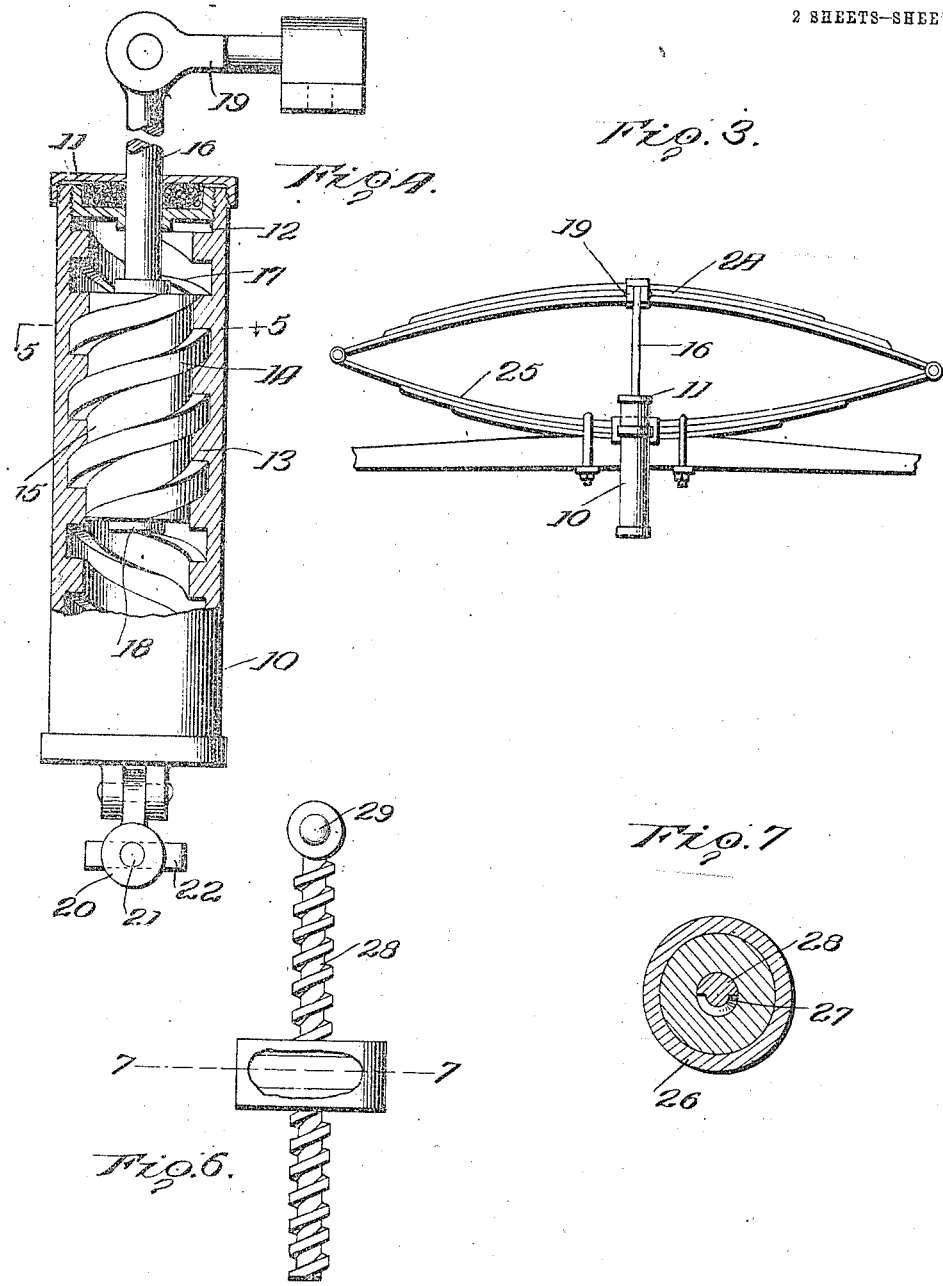

UNITED STATES PATENT OFFICE.

McCLELLAN C. FULLENLOVE, OF LOUISVILLE, KENTUCKY, ASSIGNOR TO MEMPHIS SHOCK ABSORBER COMPANY, A CORPORATION OF ARIZONA.

SHOCK-ABSORBER.

1,068,644.  Specification of Letters Patent.  Patented July 29, 1913.

Application filed May 22, 1912. Serial No. 698,940.

*To all whom it may concern:*

Be it known that I, McClellan C. Fullenlove, citizen of the United States, residing at Louisville, in the county of Jefferson and State of Kentucky, have invented certain new and useful Improvements in Shock-Absorbers, of which the following is a specification.

My invention relates to new and useful improvements in shock absorbers for vehicles, and the object of my invention is to provide a device which may be applied to a vehicle in addition to the ordinary springs and which will permit the free working of the springs under normal conditions, but which will take up the strain under abnormal conditions and limit extreme distortion of the springs and consequently prevent undue movement of the vehicle body.

A further object of my invention is to provide a shock absorber which may be applied to vehicles of all types, but which is particularly applicable to motor vehicles.

A further object of my invention is to provide a shock absorber in which the required resistance is obtained by the friction between interengaging threads of a plurality of telescopic members. And a still further object of my invention is to provide a novel means for mounting my shock absorber upon the vehicle in such a manner that the telescopic members are at all times maintained in alinement with each other.

With these and other objects in view, my invention will be more fully described, illustrated in the accompanying drawings, and then specifically pointed out in the claims which are attached to and form a part of this application.

In the drawings: Figure 1 is a side elevation of my improved shock absorber, showing one way of attaching the same to a vehicle, the axle of which is shown in section; Fig. 2 is a rear elevation, showing another way of attaching the shock absorber; Fig. 3 shows a still further way of applying the device; Fig. 4 is an elevation partially in section, showing the structure of the shock absorber; Fig. 5 is a transverse section on the line 5—5 of Fig. 4; Fig. 6 is an elevation partially in section of a modified form of shock absorber; Fig. 7 is a transverse section on the line 7—7 of Fig. 6.

Corresponding and like parts are referred to in the following description and indicated in all the views of the drawings by the same reference characters.

The preferred embodiment of my shock absorber includes an internally threaded member secured to the axle, either directly or indirectly through the medium of a spring and an externally threaded member telescopically engaging with the first member and free to turn in the same and having a swiveled connection with the vehicle spring or with the body of the vehicle. The first of these members includes a cylindrical casing 10, formed of any preferred metal closed at its lower end and provided at its upper end with a removable closure 11 including in its construction a stuffing box 12. The body 10 is internally threaded, as shown at 13, for engagement with the threads 14 of the second member 15, which member, in this case, consists of a cylindrical body member of metal fitting within the member 10 and threaded for engagement with said member. The cylindrical member 15 is provided with a central, longitudinally extending bore, through which is passed one end of a shaft 16, the bore and shaft being so proportioned as to permit the member 15 to revolve freely upon the shaft, said member being held against disengagement from the shaft by collars 17 and 18 mounted upon the shaft one above and one below the cylindrical member 15. The free end of the shaft 16 is passed through the stuffing box 12 and the closure 11 and is pivotally connected to one end of a bar 19, the other end of which is secured to the spring of the vehicle or to the body of the vehicle itself, as the case may be. The closed lower end of the body member 10 is provided with spaced apart, downwardly directed, perforated ears 20 adapted to receive a pivot pin 21 for pivotal attachment to one end of a bar 22, the other end of which is preferably secured to a spring 23 carried by the vehicle axle.

As will be readily apparent any normal movement of the body of the vehicle with respect to the running gear will be permitted without hindrance by the shock absorber above described. In case of any abnormal movement, caused by exceptionally rough roads or the like, the resultant movement of the springs would naturally be much more rapid than the movement of the member 15 and the member 10 which movement is retarded by the frictional engagement of the threads 13 and 14. The members 10 and 15 will therefore serve as a check or brake to limit both the downward and upward movement of the body of the vehicle and so absorb all unusual shocks.

If desired, the collar 17 may be omitted when the shock absorber will have no effect upon the downward movement of the body of the vehicle, but will still act to cushion and limit its rebound or upward movement. Because of the pivotal connections between the body members of the shock absorber and the bars 19 and 22, by which it is mounted upon the vehicle, the members 10 and 15 are consequently held in alinement with each other and the frictional engagement between the two is therefore practically constant.

It will of course be apparent that the strength or stiffness of the shock absorber depends upon the size and pitch of the interengaging threads, and that it is therefore a simple matter to construct shock absorbers which will offer any desired resistance.

In Fig. 3 of the drawings, I have illustrated a somewhat modified form of construction in which the body member 10 is secured intermediate its length directly to the axle of the vehicle and in which the free end of the shaft 16 is secured directly to the upper member 24 of the double elliptic spring 25. This form is particularly applicable to light vehicles and particularly to those classes of vehicles drawn by horses.

In Fig. 6, I have shown a still further modified form of construction including a relatively short cylindrical member 26 provided with an internally threaded bore 27 through which extends the externally threaded shaft 28. In this form of construction the cylindrical member 26 is mounted in a housing which is secured to the axle, while the upper end of the shaft 28 is swivelly connected to a head 29 which is secured to the spring. The shaft 28, as shown, passes completely through the cylindrical member 26.

From the foregoing description, it will be apparent that I have provided an extremely simple and effective form of shock absorber and one which may be readily applied to any type of vehicle. It will further be apparent that the resistance offered by the shock absorber against movement is directly proportional to the speed and extent of the movement against which the shock absorber is acted, thus giving a variable resistance which automatically changes to meet all requirements.

Having thus described the invention, what is claimed as new is:

1. A shock absorber including an internally threaded cylindrical body member, an externally threaded body member movable within the first and with its threads in engagement with the threads of the body member to frictionally oppose movement of one member with respect to the other, said second member being provided with a central longitudinal bore, a shaft extending through the bore and free to turn therein, collars carried by the shaft and bearing against the ends of the second member to prevent its longitudinal movement upon the shaft, means for securing the body member to the running gear of a vehicle, and means for securing the free end of the shaft to the body of the vehicle.

2. A shock absorber including a cylindrical body member closed at its lower end and internally threaded, a second cylindrical member externally threaded to engage with the threads of the first member, a shaft extending longitudinally through the second member and free to rotate therein, means for preventing longitudinal movement of the shaft to said second member, a closure including a stuffing box for the first member, the free end of the shaft passing through said closure, a bar pivotally connected to the free end of the shaft by one end and adapted for pivotal connection to the body of a vehicle by its other, a spring adapted for attachment to the axle of a vehicle, and a bar rigidly secured by one end to the spring and pivotally secured by its other end to the closed end of the body member.

3. A shock absorber including an internally threaded body member, an externally threaded body member movable within the first and with its threads in engagement with the threads of the first to frictionally oppose movement of one member with respect to the other, said second member being provided with an axially extending bore, a shaft extending through the bore and free to turn therein, a collar carried by the lower end of the shaft and bearing against the lower end of the second member, means for securing the first member to the running gear of a vehicle, and means for securing the free end of the shaft to the body of the vehicle.

4. A shock absorber including a spring adapted for attachment to the running gear of a vehicle, a bracket adapted for attachment to the body of a vehicle, an internally threaded body member pivotally connected to the free end of the spring, an externally threaded member telescopically mounted in the body member with the threads of one engaging with the threads of the other, and operative connecting means between the externally threaded member and the bracket.

5. A shock absorber including a spring adapted for attachment by one end to the running gear of a vehicle, an internally threaded cylindrical casing pivoted by one end to the free end of the spring, an externally threaded member movable in the cylinder and engaging with the threads thereof, a shaft swivelly connected with said externally threaded member, and a bracket pivotally connected to the free end of the shaft and adapted for attachment to the body of a vehicle.

In testimony whereof I affix my signature in presence of two witnesses.

McCLELLAN C. FULLENLOVE. [L. S.]

Witnesses:
BENJ. F. GARDNER,
CAMILLE L. DETERT.